United States Patent
Wiederin

(10) Patent No.: US 10,741,374 B1
(45) Date of Patent: Aug. 11, 2020

(54) RAPID FLOW-THROUGH SAMPLING SYSTEM WITH TRIGGERED INTRODUCTION TO NEBULIZER

(71) Applicant: Elemental Scientific, Inc., Omaha, NE (US)

(72) Inventor: Daniel R. Wiederin, Omaha, NE (US)

(73) Assignee: ELEMENTAL SCIENTIFIC, INC., Omaha, NE (US)

( * ) Notice: Subject to any disclaimer, the term of this patent is extended or adjusted under 35 U.S.C. 154(b) by 0 days.

(21) Appl. No.: 16/415,284

(22) Filed: May 17, 2019

Related U.S. Application Data

(60) Provisional application No. 62/672,689, filed on May 17, 2018.

(51) Int. Cl.
| | |
|---|---|
| *H01J 49/00* | (2006.01) |
| *G01N 21/00* | (2006.01) |
| *H01J 49/10* | (2006.01) |
| *H01J 49/04* | (2006.01) |
| *G01N 21/71* | (2006.01) |

(52) U.S. Cl.
CPC .......... *H01J 49/105* (2013.01); *G01N 21/714* (2013.01); *H01J 49/045* (2013.01)

(58) Field of Classification Search
CPC ..... H01J 49/105; H01J 49/045; G01N 21/714

USPC .................................................. 250/281, 288
See application file for complete search history.

(56) References Cited

U.S. PATENT DOCUMENTS

| | | | | |
|---|---|---|---|---|
| 8,925,375 | B1 * | 1/2015 | Wiederin | G01N 1/38 73/61.55 |
| 2002/0190204 | A1 * | 12/2002 | Hofstadler | H01J 49/04 250/288 |
| 2014/0347663 | A1 * | 11/2014 | Rodes | G01N 1/2273 356/338 |

* cited by examiner

*Primary Examiner* — Nicole M Ippolito
(74) *Attorney, Agent, or Firm* — Kevin E. West; Advent LLP

(57) ABSTRACT

Systems and methods are described for rapid throughput of samples from a plurality of sample sources to a nebulizer for analysis, such as a sample analysis via ICP-MS. A system embodiment can include, but is not limited to, a valve in fluid communication with a fluid transfer line to receive a plurality of samples from a plurality of sample sources from an autosampler unit and direct the sample into a valve channel; a first pump to draw sample into the valve channel, a sensor positioned adjacent a nebulizer to detect respective samples of the plurality of samples and generate one or more signals in response thereto; a second pump to push the sample from the valve channel to the nebulizer; and a controller configured to coordinate operation of the first pump, the second pump, and the valve based at least on the one or more signals.

20 Claims, 4 Drawing Sheets

RAPID FLOW-THROUGH SAMPLING SYSTEM WITH TRIGGERED INTRODUCTION TO NEBULIZER

CROSS-REFERENCE TO RELATED APPLICATIONS

The present application claims the benefit of 35 U.S.C. § 119(e) of U.S. Provisional Application Ser. No. 62/672,689, filed May 17, 2018, and titled "RAPID FLOW-THROUGH SAMPLING SYSTEM WITH TRIGGERED INTRODUCTION TO NEBULIZER." U.S. Provisional Application Ser. No. 62/672,689 is herein incorporated by reference in its entirety.

BACKGROUND

Inductively Coupled Plasma (ICP) spectrometry is an analysis technique commonly used for the determination of trace element concentrations and isotope ratios in liquid samples. ICP spectrometry employs electromagnetically generated partially ionized argon plasma which reaches a temperature of approximately 7,000K. When a sample is introduced to the plasma, the high temperature causes sample atoms to become ionized or emit light. Since each chemical element produces a characteristic mass or emission spectrum, measuring the spectra of the emitted mass or light allows the determination of the elemental composition of the original sample.

Sample introduction systems may be employed to introduce the liquid samples into the ICP spectrometry instrumentation (e.g., an Inductively Coupled Plasma Mass Spectrometer (ICP/ICP-MS), an Inductively Coupled Plasma Atomic Emission Spectrometer (ICP-AES), or the like) for analysis. For example, a sample introduction system may withdraw an aliquot of a liquid sample from a container and thereafter transport the aliquot to a nebulizer that converts the aliquot into a polydisperse aerosol suitable for ionization in plasma by the ICP spectrometry instrumentation. The aerosol is then sorted in a spray chamber to remove the larger aerosol particles. Upon leaving the spray chamber, the aerosol is introduced into the plasma by a plasma torch assembly of the ICP-MS or ICP-AES instruments for analysis.

SUMMARY

Systems and methods are described for rapid throughput of samples from a plurality of sample sources to a nebulizer for analysis, such as sample analysis via ICP-MS. A system embodiment can include, but is not limited to, a pump in fluid communication with a fluid transfer line, the fluid transfer line configured to receive a plurality of samples from a plurality of sample sources from an autosampler unit; a sensor positioned adjacent a nebulizer to detect respective samples of the plurality of samples and generate one or more signals in response thereto; and a controller configured to coordinate transfer of the plurality of samples from the fluid transfer line to the nebulizer with operation of the autosampler unit; a valve in fluid communication with a fluid transfer line to receive a plurality of samples, the valve including a valve channel having a volume to hold a single sample; a first pump in fluid communication with the valve, the first pump in fluid communication with each of the valve and the fluid transfer line when the valve is in the first valve configuration and not in fluid communication with the fluid transfer line when the valve is in the second valve configuration; a sensor positioned adjacent a nebulizer to detect respective samples of the plurality of samples, the nebulizer in fluid communication with the valve channel when the valve is in the first valve configuration and not in fluid communication with the valve channel when the valve is in the second valve configuration; a second pump in fluid communication with the valve to move fluids through the system, the second pump in fluid communication with the valve channel and the nebulizer when the valve is in the second valve configuration to introduce a sample held in the valve channel to the nebulizer, the second pump not in fluid communication with the nebulizer when the valve is in the first valve configuration; and a controller operably coupled with the sensor to receive the one or more signals, the controller configured to coordinate operation of the first pump, the second pump, and the valve based at least on the one or more signals.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures.

DETAILED DESCRIPTION

Overview

Figure 1A:
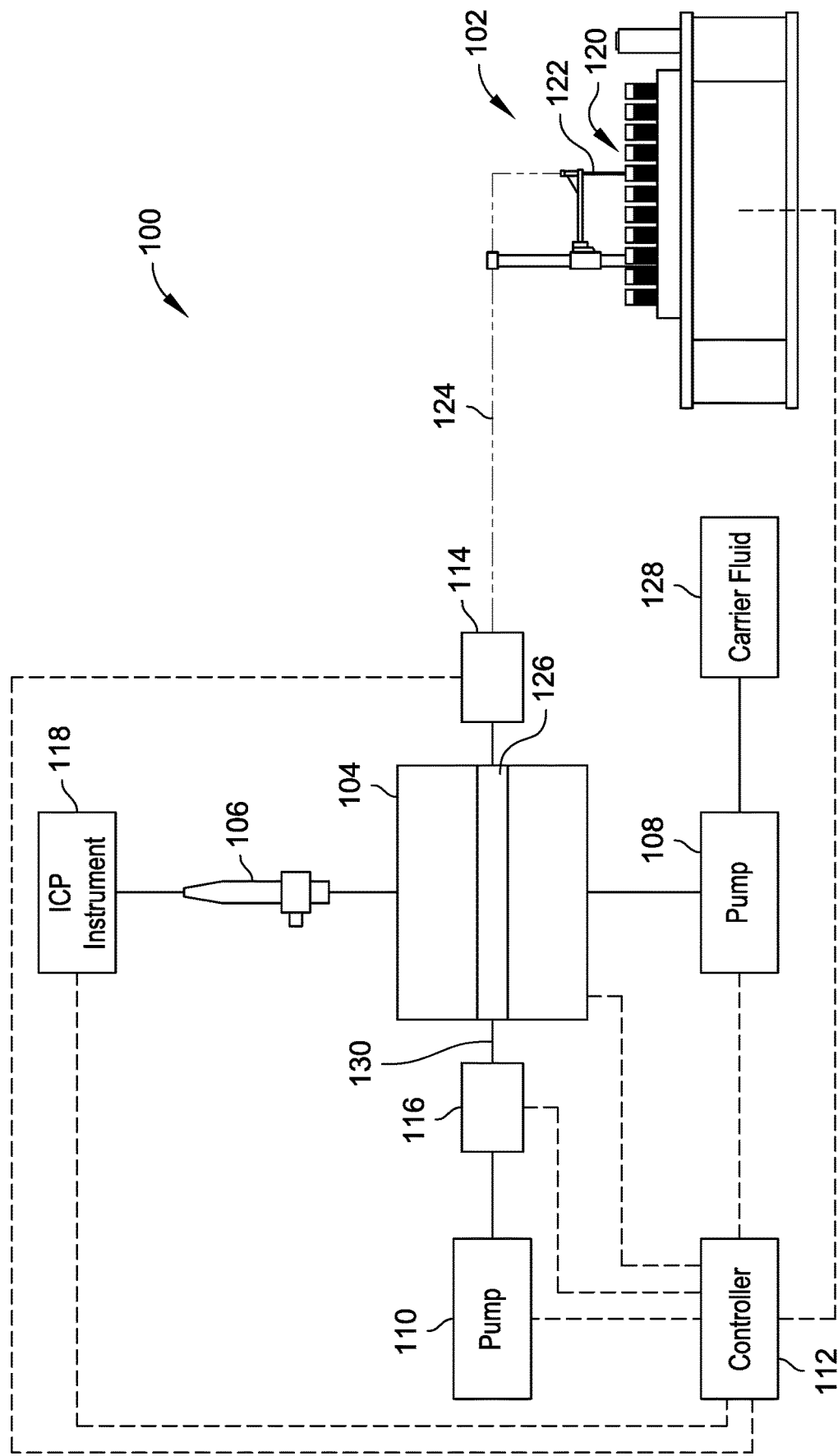
FIG. 1A is a diagrammatic illustration of a system for rapid throughput of samples from a plurality of sample sources to a nebulizer for analysis, in accordance with example implementations of the present disclosure.

Sample introduction systems can be employed to introduce liquid samples into inductively coupled plasma (ICP) spectrometry instrumentation or other analysis systems for analysis. For example, pump systems, valve systems, and autosampling systems can deliver a sample from a sample source (e.g., a sample vial) through one or more valves and into a nebulizer for subsequent chemical component analysis by ICP spectrometry instrumentation. When multiple samples are handled by such sample introduction systems, the throughput of the systems can be limited by a number of factors, such as transfer rates of samples through the fluid lines of the system, the ability of the system to recognize which sample has been drawn into the system through the autosampling system, the ability of the system to track which sample is introduced to the ICP spectrometry instrumentation, and the like. For example, biological samples can be provided for analysis in microtiter trays, where such trays can include hundreds of wells containing samples (e.g., 384 well microtiter plates or the like). Inefficiencies in sample handling for manual or automated sample processing or limitations in throughput of analyzing such samples are compounded through the process of handling each of the hundreds of samples, resulting in large potential time and monetary costs associated with processing the samples.

Accordingly, the present disclosure is directed, at least in part, to a sample preparation system that draws multiple samples into a transfer line between an autosampler unit that draws the samples from a plurality of sample sources (e.g., wells of a microtiter plate, sample vials positioned in a sample rack, etc.) and a connector in fluid communication with a nebulizer. For example, the connector can include a rotary valve (or a junction, such as a T-connector, for use with a self-aspirating nebulizer) coupled to the transfer line to receive the samples from the autosampler unit. The connector can then transfer the sample to a nebulizer upon verification of the presence of the sample at the connector to inject the sample for analysis by ICP spectrometry instrumentation (e.g., ICP-MS). Verification of the sample presence can be facilitated by a sensor (e.g., optical sensor, capacitive sensor, etc.) adjacent to or integrated with the connector and adjacent to the nebulizer to detect the presence of the sample in the fluid line/channel adjacent to or within the connector. In an aspect, once the sample is detected, or upon a predetermined passage of time upon detection, the connector includes a valve that switches flow path configurations (e.g., a rotary selector valve rotating between at least two flow path configurations) to introduce the sample to the nebulizer for injection into ICP spectrometry instrumentation for analysis.

The system can introduce a gas or intervening fluid into the transfer line between each sample, such that upon injection of one sample to the ICP spectrometry instrumentation, the subsequent sample in the transfer line can be detected at the connector, loaded into the connector, and injected in turn. The system coordinates the introduction of sample to the transfer line by the autosampler unit and the transfer of samples to the nebulizer through a controller monitoring the sensor that detects the presence of the sample at the connector.

In an aspect, the connector includes a valve located at a base of the nebulizer to precisely control the amount of time between detection of the sample at the valve and introduction of the sample to the nebulizer, such that when the valve switches configurations to introduce the sample to the nebulizer, the sample is nearly instantaneously available for analysis by the ICP spectrometry instrumentation. When multiple samples are present in the transfer line, separated by gas or intervening fluid to preserve separation and identification of the different samples, the system can detect and inject the various samples continuously for rapid throughout of sample analysis.

Example Implementations

Referring generally to FIGS. 1A through 3, systems 100 are shown for rapid throughput of samples from a plurality of sample sources to a nebulizer coupled with an analysis system for analysis. The system 100 shown in FIGS. 1A and 1B includes an autosampler unit 102, a valve 104, a nebulizer 106, a pump system (e.g., pumps 108 and 110 are shown), a controller 112, a sensor system (e.g., sensors 114 and 116 are shown), and an analysis system (e.g., ICP instrument 118 is shown). The autosampler unit 102 introduces samples from a plurality of sample sources 120 through operation of the pump 110 in fluid communication with the autosampler unit 102 via the valve 104. The autosampler unit 102 includes a sample probe 122 to move between individual sample sources of the plurality of sample sources 120 (e.g., according to pre-programmed sampling protocols) to introduce a plurality of samples to the valve 104 via a transfer line 124.

In implementations, the autosampler unit 102 introduces a gas or intervening fluid into the transfer line 124 between respective samples to separate the respective samples from each other, such as to prevent mixing, and to provide a separation of samples provided to the ICP instrument 118. For example, the autosampler unit 102 can move the sample probe 122 to a container filled with intervening fluid (e.g., deionized water, carrier fluid, etc.) to draw the intervening fluid into the transfer line 124 behind the previously-drawn sample prior to introduction of the sample probe 122 to another sample source 120. In implementations, the intervening fluid is drawn into the transfer line 124 through operation of the pump 110. Alternatively or additionally, the sample probe 122 can be positioned above the sample sources 120 to draw ambient air into the transfer line 124 as a separator between samples drawn into the transfer line 124. In implementations, the system 100 can include a source of separator gas (e.g., an inert gas source) with a fluid line coupled between the valve 104 and the autosampler unit 102 to introduce the separator gas into the transfer line 124 between samples drawn into the transfer line 124. For example, the source of separator gas can include a pressurized container of gas that introduces gas under pressure into the transfer line (e.g., via a valve or connector) to separate samples drawn into the transfer line 124.

The controller 112 is operably coupled to components of the system 100 to facilitate coordination of drawing samples into the system 100 and introducing the samples from the valve 104 to the nebulizer 106 for injection into the ICP instrument 118 for rapid throughput of samples. For example, the controller 112 can control operation of one or more of the autosampler unit 102, the valve 104, the pump 108, the pump 110, and the ICP instrument 118 based on signals received from one or more of the sensor 114, the sensor 116, and the ICP instrument 118. The controller 112 can include a computer processor configured to execute sample analysis protocols stored in a computer memory, can be part of a computing device having a processor and memory, or combinations thereof, examples of which are described herein. An example control implementation of the system 100 is described with reference to FIGS. 1A and 1B. As shown in FIG. 1A, the pump 110 is in fluid connection with the autosampler unit 102 via the valve 104 in a first fluid flow configuration to draw a first sample into the transfer line 124. The autosampler unit 102 then moves the sample probe 122 to a second position in the plurality of sample sources 120 (e.g., to a second sample vial, a second microtiter well, etc.), whereby the pump 110 operates to draw a second sample into the transfer line 124. Alternatively, the sample probe 122 remains in place while the plurality of samples 120 or a sample container thereof moves with respect to the sample probe 122 to introduce a different sample to the sample probe 122. The first sample and the second sample can be separated from each other by an intervening gas or fluid drawn into the transfer line 124 between positioning the autosampler unit 102 from the first position to the second position. During transit of the samples in the transfer line 124, the sensor 114 detects a sample within the transfer line 124. The controller 112 determines an identity of the sample detected by the sensor 114, for example, based on the positioning of the sample probe 122, the volume of the transfer line 124, the flow rate of the pump 110, and the like. For example, the controller can determine an identity of the sample based on a time of sample acquisition made by the autosampler unit 102, a volume of the transfer line 124, a flow rate of the pump 110, and a time of operation of the pump 110. A given sample is expected to reach the sensor 114 in a time period proportional to the volume of the transfer line 124, the flow rate of the pump 110, and the time of operation of the pump 110. Alternatively or additionally, a sample can be given a distinct marker (e.g., visible dye) detectable by the sensor 114 to uniquely identify the sample in a particular time period.

In implementations, the valve 104 is a rotary selector valve switchable between positions or valve configurations providing differing flow path configurations (e.g., under control by the controller 112). For example, in a first valve configuration, shown in FIG. 1A, the valve 104 adopts a first fluid flow configuration that permits fluid communication between the autosampler unit 102 and the pump 110 to draw samples into the transfer line 124 and into the valve 104. In a second valve configuration, shown in FIG. 1B, the valve 104 adopts a second fluid flow configuration that permits fluid communication between the pump 108 and the nebulizer 106 to introduce sample contained within the valve 104 to the nebulizer 106 through operation of the pump 108 (e.g., coordinated by the controller 112). The controller 112 can control the valve 104 or coordinate operations of a local valve controller to switch between its positions or configurations through receipt of signals from the sensor system indicating the presence of sample within the valve 104. For example, the sensor 114 can include an optical sensor, capacitive sensor, ultrasound sensors, or other sensor to register a fluid sample within the transfer line 124 adjacent the valve 104. The sensor 114 sends one or more signals to the controller 112, where detection of a sample can trigger the controller 112 to switch the valve 104 from the first valve configuration (shown in FIG. 1A) to the second valve configuration (shown in FIG. 1B) and to permit operation of the pump 108 to push the sample out of the valve 104 to the nebulizer 106, such as through introduction of a carrier fluid from a carrier fluid source 128.

The valve 104 can include a channel 126 having a volume to hold at least a portion of the sample received from the transfer line 124. For example, the volume of the channel 126 can be 10 µL, 5 µL, 1 µL, or other size to facilitate holding of a sample received from the transfer line 124 until the controller 112 facilitates transfer of the sample from the channel 126 into the nebulizer 106. An example valve stator 200 of the valve 104 is shown with reference to FIGS. 2A through 2C, where the stator 200 defines the channel 126. The channel 126 can facilitate rapid throughput of samples through the system 100 by avoiding time used to fill a sample into an external loop or volume of fluid line outside the valve, where the fluid flows through the valve before filling the external loop or the external fluid line. For instance, conventional sample handling systems tend to overfill external sample loops or fluid lines with sample to ensure a filled external loop or volume. Such overfill results in wasted sample and wasted time used to move the sample through the external loop or volume. Additionally, sample present in an external loop or volume requires a greater travel distance and time to pass back through a valve in fluid communication with a nebulizer, resulting in reduced throughput of sample handling as compared to the systems 100 described herein.

In implementations, the sensor system includes the sensor 116 positioned between the pump 110 and the valve 104 to sense fluid within a fluid line 130 coupled between the pump 110 and the valve 104. The sensor 116 can send one or more signals to the controller 112 to indicate detection of the sample within the fluid line 130. Such signals can be utilized by the controller 112 to control operation of the valve 104. For example, the sensor 114 can detect a sample fluid within the transfer line 124 at a first time and send a signal to the controller 112, whereas the sensor 116 can detect the sample fluid within the fluid line 130 at a second time and send a signal to the controller 112. Upon receipt of the signal from the sensor 116, the controller 112 identifies that a sample is contained within the channel 126 and controls the valve 104 to switch from the first position to the second position. The controller 112 then controls the pump 108 to deliver the sample from the valve 104 to the nebulizer 106 for analysis by the ICP instrument 118. The controller 112 can be operably coupled with the ICP instrument 118 to facilitate control of information with respect to sample identity, sample composition, sample analysis, and the like within the system 100. In implementations, the system 100 can include a sensor positioned adjacent the autosampler unit 102 to detect samples as they leave the autosampler unit 102 in the transfer line 124. The controller 112 can compare the signals from the sensor adjacent the autosampler unit 102 to signals received from one or more of the sensor 114 and the sensor 116 to determine whether the signals match (i.e., indicating a similar pattern of fluid samples have reached the valve 104). The controller 112 can generate an alert if the signals do not match, which could indicate a separation of samples within the transfer line 124 or other differentiation.

The pumps 108 and 110 can include syringe pumps, peristaltic pumps, or other pump configured to move fluids through the system 100. In implementations, the pumps 108 and 110 are syringe pumps, where pump 108 can draw samples from the autosampler unit 102 into the transfer line 124 and into the valve 104 during a draw motion of the syringe pump, and where pump 110 can push carrier fluid 128 into the valve 104 during an inject/push motion. The volume of the syringe pumps 108 and 110 can be tailored based on the total number of samples to be handled by the system 100. For example, the pump 110 can have a volume suitable to draw all samples from the plurality of sample sources 120 during the draw motion without pushing the syringe back to an initial rest position, and the pump 108 can have a volume suitable to push all samples received into the transfer line 124 to the nebulizer 124 during the inject/push motion without drawing the syringe back to an initial filled position. The syringes of the pumps 108 and 110 can be reset to their default positions during a change out operation of the plurality of sample sources 120 (e.g., changing the microtiter plate(s), sample vials, etc. present at the autosampler unit 102). The controller 112 controls operation of the pumps 108 and 110, for example, to permit alternating operation of each pump such that when the valve 104 is in the first position (e.g., shown in FIG. 1A) the pump 110 draws samples and the pump 108 is stationary or directing carrier fluid to a different location within the system 100 (e.g., waste, a different valve, etc.), and when the valve 104 is in the second position (e.g., shown in FIG. 1B), the pump 110 is stationary and the pump 108 pushes carrier fluid into the valve 104 to push sample to the nebulizer 106.

Figure 1B:
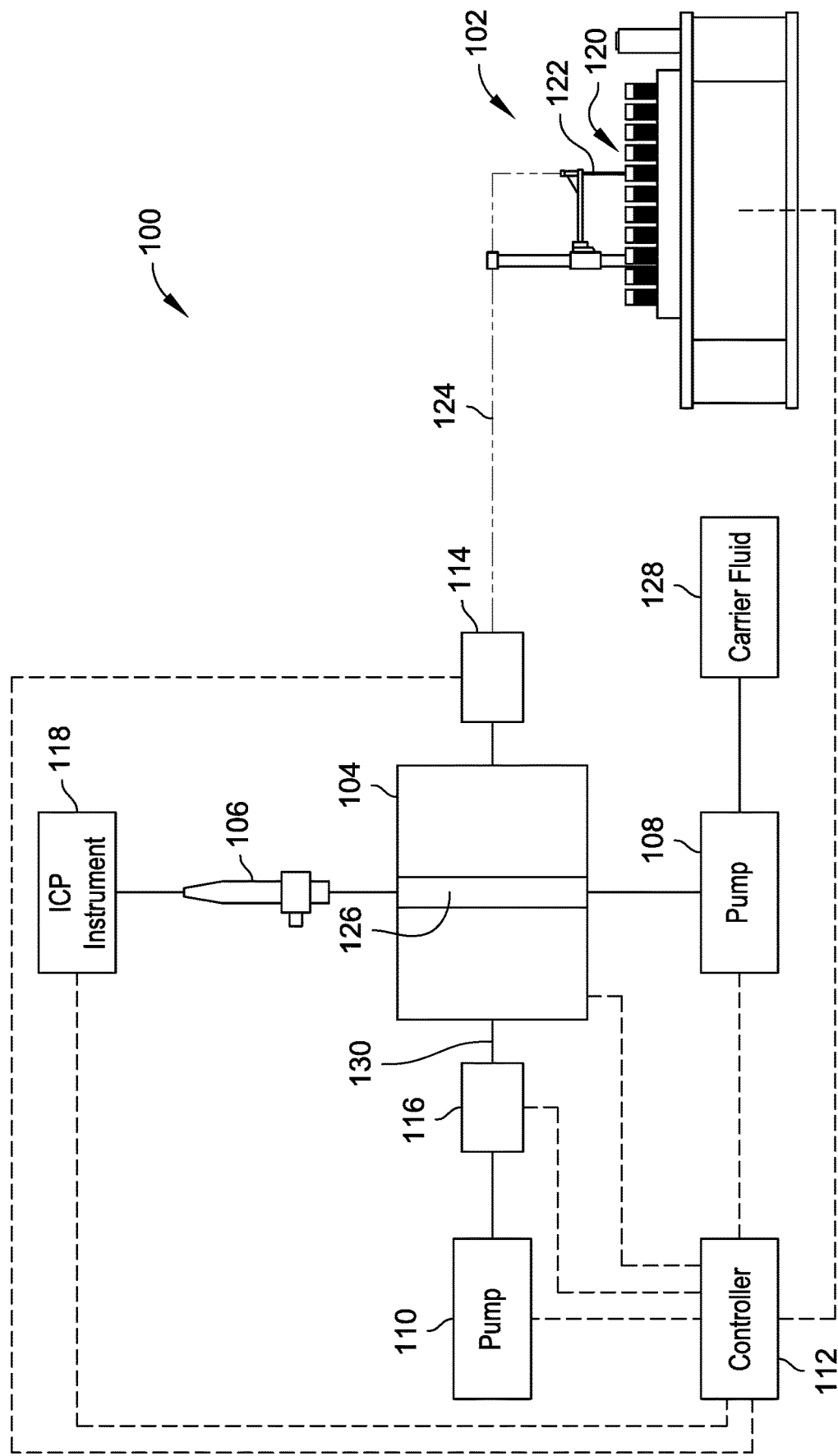
FIG. 1B is a diagrammatic illustration of the system of FIG. 1A in a configuration to dispense the sample from a valve to the nebulizer.
Figure 2B:
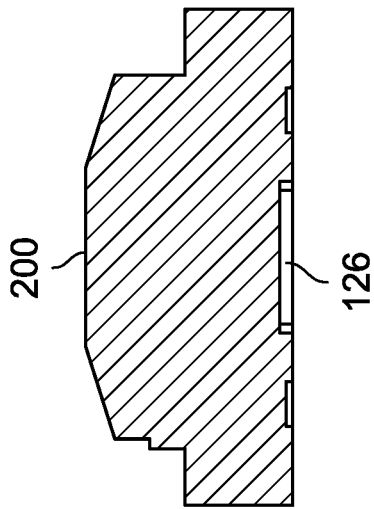
FIG. 2B is a cross sectional view of the stator of FIG. 2A.
Figure 2C:
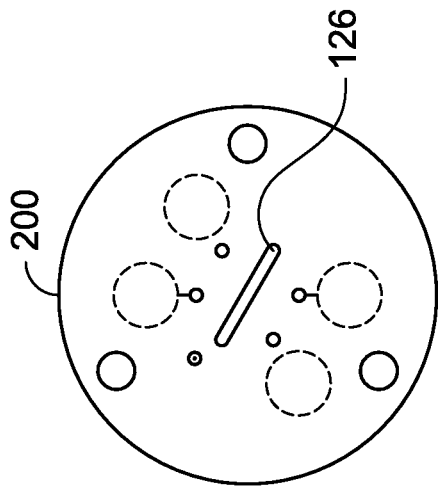
FIG. 2C is a bottom plan view of the stator of FIG. 2A.
Figure 2A:
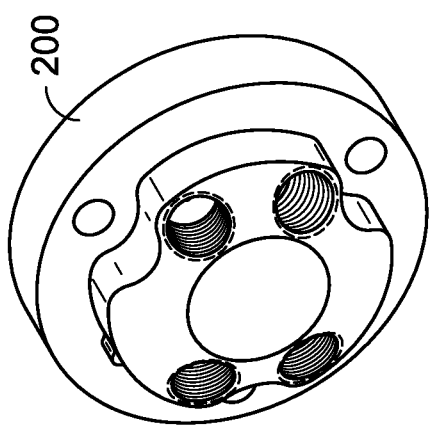
FIG. 2A is an isometric view of a stator of the valve of the system of FIGS. 1A and 1B in accordance with example implementations of the present disclosure.
Figure 3:
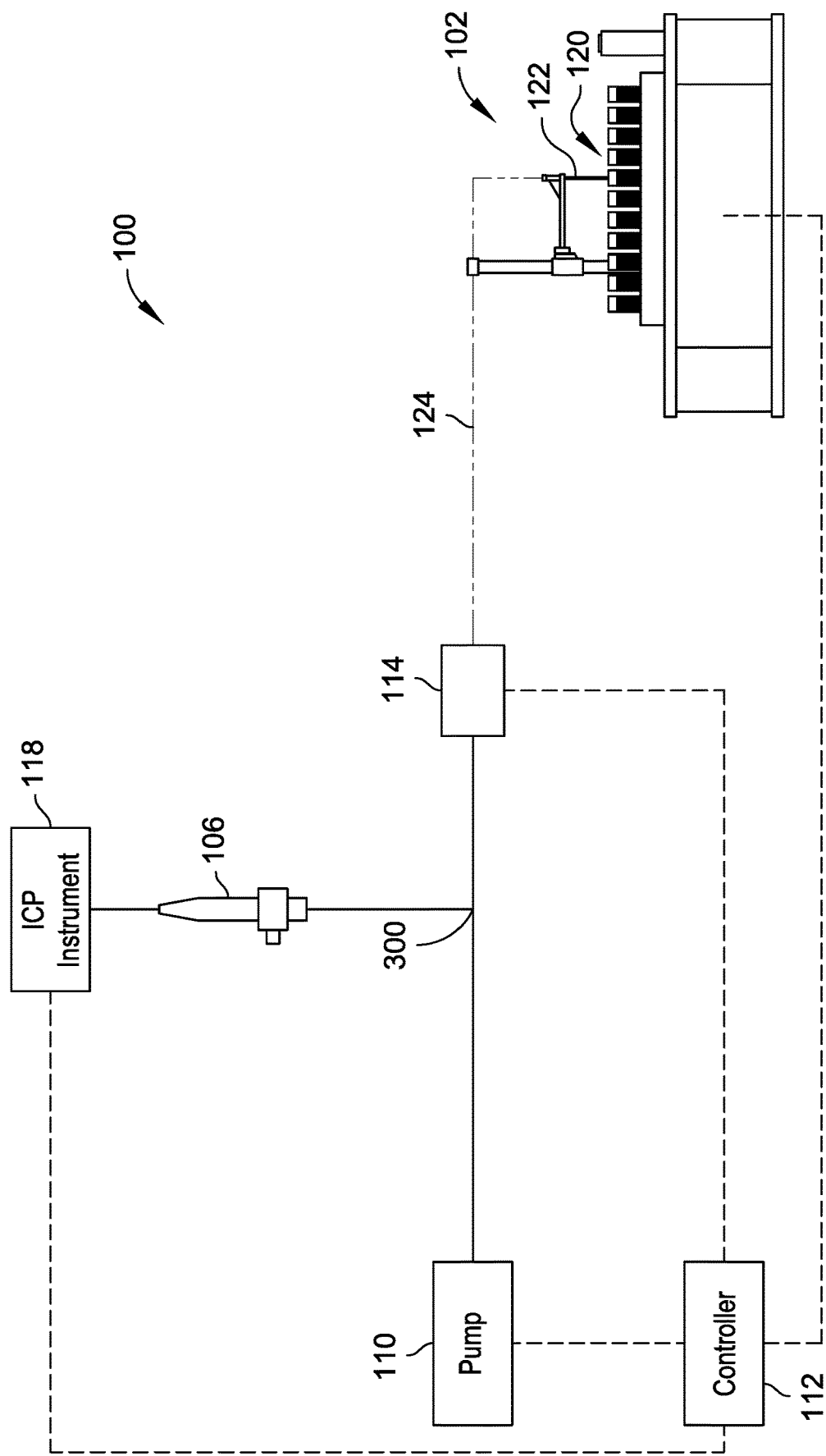
FIG. 3 is a diagrammatic illustration of a system for rapid throughput of samples from a plurality of sample sources to a nebulizer for analysis, in accordance with example implementations of the present disclosure.

Referring to FIG. 3, the system 100 is shown in accordance with an example implementation which utilizes a junction 300 to introduce sample from the transfer line 124 to the nebulizer 106 instead of a configuration utilizing the valve 104 described with reference to FIGS. 1A and 1B. The junction 300 can include, but is not limited to, a T connector, a manifold, a tube joint connector, or the like. In the example implementation shown in FIG. 3, the nebulizer 106 is a self-aspirating nebulizer configured to draw sample from the transfer line 124 during operation of the pump 110. The sensor 114 can send signals to the controller 112 upon detection of samples in the transfer line 124. The controller 112 can then coordinate the operation of the ICP instrument 118 with operation of the autosampler unit 102 to associate an identity of sample detected by the sensor 114 with analysis of the sample by the ICP instrument 118.

The system 100 can automatically manage introduction of samples from the plurality of sample sources 120 to the valve 104 or junction 300 and subsequently to the nebulizer 106 for injection of the samples to the ICP instrument 118 through operation of valves, pumps, controllers, or other components of the system 100. For example, the system 100 can include a computing device (e.g., controller 112) having a processor and memory or communicatively coupled with a processor and/or memory. The processor provides processing functionality for the computing device and may include any number of processors, micro-controllers, controller 112, or other processing systems, and resident or external memory for storing data and other information accessed or generated by the computing device. The processor may execute one or more software programs that implement the techniques described herein. The processor is not limited by the materials from which it is formed or the processing mechanisms employed therein and, as such, may be implemented via semiconductor(s) and/or transistors (e.g., electronic integrated circuits (ICs)), and so forth.

Memory accessible by the controller 112 is an example of device-readable storage media that provides storage functionality to store various data associated with the operation of the computing device, such as software programs or code segments, or other data to instruct the processor and other elements of the computing device to perform the techniques described herein. A wide variety of types and combinations of memory may be employed. The memory may be integral with the processor, stand-alone memory, or a combination of both. The memory may include, for example, removable and non-removable memory elements such as RAM, ROM, Flash (e.g., SD Card, mini-SD card, micro-SD Card), magnetic, optical, USB memory devices, and so forth. In embodiments of the computing device, the memory may include removable ICC (Integrated Circuit Card) memory such as provided by SIM (Subscriber Identity Module) cards, USIM (Universal Subscriber Identity Module) cards, UICC (Universal Integrated Circuit Cards), and so on.

The computing device includes a display to display information to a user of the computing device. In embodiments, the display may comprise a CRT (Cathode Ray Tube) display, an LED (Light Emitting Diode) display, an OLED (Organic LED) display, an LCD (Liquid Crystal Diode) display, a TFT (Thin Film Transistor) LCD display, an LEP (Light Emitting Polymer) or PLED (Polymer Light Emitting Diode) display, and so forth, configured to display text and/or graphical information such as a graphical user interface. The display may be backlit via a backlight such that it may be viewed in the dark or other low-light environments. The display may be provided with a touch screen to receive input (e.g., data, commands, etc.) from a user. For example, a user may operate the computing device by touching the touch screen and/or by performing gestures on the touch screen. In some embodiments, the touch screen may be a capacitive touch screen, a resistive touch screen, an infrared touch screen, combinations thereof, and the like. The computing device may further include one or more input/output (I/O) devices (e.g., a keypad, buttons, a wireless input device, a thumbwheel input device, a trackstick input device, and so on). The I/O devices may include one or more audio I/O devices, such as a microphone, speakers, and so on.

The computing system may also include a communication interface to transfer of data or control instructions between different devices (e.g., components/peripherals) and/or over one or more networks. The communication interface may include a variety of communication components and functionality including, but not necessarily limited to: a browser; a transmitter and/or receiver; data ports; software interfaces and drivers; networking interfaces; data processing components; and so forth.

The one or more networks are representative of a variety of different communication pathways and network connections which may be employed, individually or in combinations, to communicate among the components of the automatic sampling and digestion environment. Thus, the one or more networks may be representative of communication pathways achieved using a single network or multiple networks. Further, the one or more networks are representative of a variety of different types of networks and connections that are contemplated including, but not necessarily limited to: the Internet; an intranet; a Personal Area Network (PAN); a Local Area Network (LAN) (e.g., Ethernet); a Wide Area Network (WAN); a satellite network; a cellular network; a mobile data network; wired and/or wireless connections; and so forth. Examples of wireless networks include, but are not necessarily limited to: networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; and so on. Wired communications are also contemplated such as through Universal Serial Bus (USB), Ethernet, serial connections, and so forth.

The computing device can include a user interface, which has functions storable in memory and executable by the processor. For example, the user interface may provide functionality to control the display of information and data to the user of the computing device via the display. In some implementations, the display may not be integrated into the computing device and may instead be connected externally using universal serial bus (USB), Ethernet, serial connections, and so forth. The user interface may provide functionality to allow the user to interact with one or more applications of the computing device by providing inputs (e.g., sample identities, sample locations, microtiter plate type, sample rack type, fluid flow rates, nebulizer operation, ICP instrumentation operation, valve timing, pump timing, etc.) via the touch screen and/or the I/O devices. For example, the user interface may cause an application programming interface (API) to be generated to expose functionality to a rapid sample throughput controller to allow the user to interact with an application by providing inputs via the touch screen and/or the I/O devices to provide desired sample throughput or sample preparation and subsequent analysis.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A system comprising:
a valve in fluid communication with a fluid transfer line, the fluid transfer line configured to receive a plurality of samples from a plurality of sample sources from an autosampler unit, the valve including a valve channel having a volume to hold a single sample from the plurality of samples, the fluid transfer line having a volume to hold multiple samples from the plurality of samples at a time, the valve switchable between at least a first valve configuration and a second valve configuration providing differing fluid flow paths;
a first pump in fluid communication with the valve to move fluids through the system, the first pump in fluid communication with each of the valve and the fluid transfer line when the valve is in the first valve configuration to introduce a sample of the plurality of samples into the valve channel, the first pump not in fluid communication with the fluid transfer line when the valve is in the second valve configuration;
a sensor positioned adjacent a nebulizer to detect respective samples of the plurality of samples and generate one or more signals in response thereto, the nebulizer in fluid communication with the valve channel when the valve is in the first valve configuration, the nebulizer not in fluid communication with the valve channel when the valve is in the second valve configuration;

a second pump in fluid communication with the valve to move fluids through the system, the second pump in fluid communication with the valve channel and the nebulizer when the valve is in the second valve configuration to introduce a sample held in the valve channel to the nebulizer, the second pump not in fluid communication with the nebulizer when the valve is in the first valve configuration; and a controller operably coupled with the sensor to receive the one or more signals, the controller configured to coordinate operation of the first pump, the second pump, and the valve based at least on the one or more signals.

2. The system of claim 1, wherein the first pump is a syringe pump.

3. The system of claim 2, wherein the first pump has a volume to draw all samples from the plurality of samples during a single draw motion.

4. The system of claim 1, wherein the second pump is a syringe pump.

5. The system of claim 4, wherein the second pump has a volume to push all samples from the plurality of samples to the nebulizer during a single push motion.

6. The system of claim 1, further comprising a second sensor coupled between the first pump and the valve, the second sensor configured to detect a sample drawn through the valve channel through operation of the first pump and generate one or more sense signals responsive thereto.

7. The system of claim 6, wherein the controller is operably coupled with the second sensor to receive the one or more sense signals from the second sensor.

8. The system of claim 7, wherein the controller is configured to transition the valve from the first valve configuration to the second valve configuration responsive to receipt of the one or more sense signals from the second sensor.

9. A system comprising:

a valve in fluid communication with a fluid transfer line, the fluid transfer line configured to receive a plurality of samples from a plurality of sample sources from an autosampler unit, the valve including a valve channel having a volume to hold a single sample from the plurality of samples, the fluid transfer line having a volume to hold multiple samples from the plurality of samples at a time, the valve switchable between at least a first valve configuration and a second valve configuration providing differing fluid flow paths;

a pump in fluid communication with the valve to move fluids through the system, the pump in fluid communication with each of the valve and the fluid transfer line when the valve is in the first valve configuration to introduce a sample of the plurality of samples into the valve channel, the pump not in fluid communication with the fluid transfer line when the valve is in the second valve configuration;

a nebulizer coupled to the valve, the nebulizer in fluid communication with the valve channel when the valve is in the second valve configuration, the nebulizer not in fluid communication with the valve channel when the valve is in the second valve configuration;

a sensor positioned adjacent the nebulizer to detect respective samples of the plurality of samples and generate one or more signals in response thereto; and a controller operably coupled with the sensor to receive the one or more signals, the controller configured to coordinate operation of at least one of the pump and the valve based at least on the one or more signals.

10. The system of claim 9, wherein the pump is a syringe pump.

11. The system of claim 10, wherein the pump has a volume to draw all samples from the plurality of samples during a single draw motion.

12. The system of claim 9, further comprising a second pump in fluid communication with the valve to move fluids through the system, the second pump in fluid communication with the valve channel and the nebulizer when the valve is in the second valve configuration to introduce a sample held in the valve channel to the nebulizer.

13. The system of claim 12, wherein the second pump is not in fluid communication with the nebulizer when the valve is in the first valve configuration.

14. The system of claim 12, wherein the second pump is a syringe pump having a volume to push all samples from the plurality of samples to the nebulizer during a single push motion.

15. The system of claim 9, further comprising a second sensor coupled between the pump and the valve, the second sensor configured to detect a sample drawn through the valve channel through operation of the pump and generate one or more sense signals responsive thereto.

16. The system of claim 15, wherein the controller is operably coupled with the second sensor to receive the one or more sense signals from the second sensor, and wherein the controller is configured to transition the valve from the first valve configuration to the second valve configuration responsive to receipt of the one or more sense signals from the second sensor.

17. A system comprising:

a pump in fluid communication with a fluid transfer line, the fluid transfer line configured to receive a plurality of samples from a plurality of sample sources from an autosampler unit;

a connector in fluid communication with the pump and the fluid transfer line and in fluid communication with a nebulizer;

a sensor positioned between the connector and the fluid transfer line to detect respective samples of the plurality of samples and generate one or more signals in response thereto; and a controller configured to coordinate transfer of the plurality of samples from the fluid transfer line to the nebulizer with operation of the autosampler unit.

18. The system of claim 17, wherein the connector includes a valve switchable between at least a first valve configuration and a second valve configuration providing differing fluid flow paths.

19. The system of claim 17, wherein the connector includes a fluid line junction.

20. The system of claim 19, wherein the nebulizer is a self-aspirating nebulizer.

* * * * *